United States Patent
Kim et al.

(10) Patent No.: US 10,351,014 B2
(45) Date of Patent: Jul. 16, 2019

(54) OPERATION CONTROL DEVICE AND METHOD FOR FUEL CELL VEHICLE

(71) Applicants: Hyundai Motor Company, Seoul (KR); Kia Motors Corporation, Seoul (KR)

(72) Inventors: Dae Jong Kim, Gyeonggi-do (KR); Gun Hyung Park, Gyeonggi-do (KR); Seung Yoon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 10 days.

(21) Appl. No.: 15/818,364

(22) Filed: Nov. 20, 2017

(65) Prior Publication Data

US 2018/0354388 A1    Dec. 13, 2018

(30) Foreign Application Priority Data

Jun. 9, 2017    (KR) .................. 10-2017-0072556

(51) Int. Cl.
  *B60L 58/40*     (2019.01)
  *B60L 11/18*     (2006.01)
  *H01M 8/04089*   (2016.01)
  *H01M 8/0438*    (2016.01)
  *B60L 58/12*     (2019.01)

(52) U.S. Cl.
  CPC .......... *B60L 11/1887* (2013.01); *B60L 58/12* (2019.02); *B60L 58/40* (2019.02); *H01M 8/0438* (2013.01); *H01M 8/04089* (2013.01); *H01M 2250/20* (2013.01)

(58) Field of Classification Search
  CPC ............ B60L 11/1887; B60L 11/1861; H01M 8/04089; H01M 8/0438; H01M 2250/20
  USPC ......................................... 701/22
  See application file for complete search history.

(56) References Cited

U.S. PATENT DOCUMENTS

| | | | |
|---|---|---|---|
| 2010/0248053 A1 | 9/2010 | Umayahara et al. | |
| 2012/0225329 A1* | 9/2012 | Kazuno ............ | H01M 8/04873 429/9 |
| 2012/0288777 A1 | 11/2012 | Kazuno et al. | |

(Continued)

FOREIGN PATENT DOCUMENTS

| | | |
|---|---|---|
| JP | H11-288731 A | 10/1999 |
| JP | 2002-204505 A | 7/2002 |

(Continued)

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

An operation control device for a fuel cell vehicle includes: a stack current determination unit monitoring a stack current of the fuel cell stack and determining whether an operation state of a fuel cell stack is in an upper-limit voltage limiting section; a battery state determination unit monitoring a state of charge (SOC) of a high voltage battery and determining whether the SOC of the high voltage battery is in a set reference SOC range; and an air flow rate control unit determining a compensation for an air flow rate of an air supply system according to the SOC of the high voltage battery, and outputting a control signal to an air compressor and an air pressure control valve according to the compensated air flow rate, when the operation state of the fuel cell stack is in the upper-limit voltage limiting section.

23 Claims, 11 Drawing Sheets

(56) References Cited

U.S. PATENT DOCUMENTS

2013/0065090 A1\* 3/2013 Kazuno ............... H01M 8/0488
429/9
2013/0320910 A1 12/2013 Reiser
2018/0126865 A1\* 5/2018 Koo ................. H01M 8/04835

FOREIGN PATENT DOCUMENTS

| JP | 2007-109569 A | 4/2007 |
| JP | 2012-238485 A | 12/2012 |
| JP | 2012-239311 A | 12/2012 |
| JP | 2012-252998 A | 12/2012 |
| JP | 2013-062097 A | 4/2013 |

\* cited by examiner

OPERATION CONTROL DEVICE AND METHOD FOR FUEL CELL VEHICLE

CROSS-REFERENCE TO RELATED APPLICATION

This application claims under 35 U.S.C. § 119(a) the benefit of Korean Patent Application No. 10-2017-0072556, filed on Jun. 9, 2017 in the Korean Intellectual Property Office, the entire contents of which are incorporated by reference herein.

BACKGROUND (a) Technical Field

The present disclosure relates to an operation control device and method for a fuel cell vehicle.

(b) Description of the Related Art

A fuel cell vehicle uses a technique for limiting an upper-limit voltage in order to prevent deterioration of a fuel cell stack. For an upper-limit voltage limiting operation, the fuel cell vehicle may reduce an air flow rate in a region where its voltage is increased to be greater than or equal to a reference limit voltage compared to a normal operation, thereby reducing a current generated in a fuel cell.

However, the fuel cell has high performance sensitivity according to an air flow rate in a low current region, so that a slight change in the air flow rate may lead to a change in charge/discharge patterns of a high voltage battery. In addition, fuel cell stacks vary in performance, and thus they may exhibit different battery charge/discharge patterns at the same air flow rate.

If the air flow rate is not precisely controlled during the upper-limit voltage limiting operation of the fuel cell vehicle, overdischarge or overcharge of the high voltage battery may occur. If this situation is repeated, the launching performance and braking performance of the vehicle may be affected.

SUMMARY

An aspect of the present disclosure provides an operation control device and method for a fuel cell vehicle, capable of precisely controlling an air flow rate according to states of charge (SOCs) during an upper-limit voltage limiting operation at a low air flow rate, thereby preventing overdischarge/overcharge of a high voltage battery and maintaining an existing SOC control function.

According to an aspect of the present disclosure, an operation control device for a fuel cell vehicle, includes: a stack current determination unit determining whether an operation state of a fuel cell stack is in an upper-limit voltage limiting section on the basis of a stack current of the fuel cell stack; a battery state determination unit monitoring a state of charge (SOC) of a high voltage battery and determining whether the SOC of the high voltage battery is in a set reference SOC range; and an air flow rate control unit determining a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

The air flow rate control unit may output a control signal corresponding to the compensated air flow rate to an air compressor and an air pressure control valve of the air supply system.

The air flow rate control unit may set revolutions per minute (RPM) of the air compressor to a minimum RPM, and control the air pressure control valve on the basis of an opening degree compensation map which is obtained by reducing a degree of opening of the air pressure control valve on a basic opening degree map used in a normal operation section of the fuel cell stack, when the SOC of the high voltage battery is greater than or equal to a minimum required SOC.

The air flow rate control unit may reduce a degree of opening of the air pressure control valve on the opening degree compensation map, and control the air pressure control valve on the basis of an updated opening degree compensation map that is updated according to the reduced degree of opening, when the SOC of the high voltage battery exceeds a maximum required SOC.

The air flow rate control unit may reset discharge energy of the high voltage battery, and accumulate charge energy of the high voltage battery, when the SOC of the high voltage battery exceeds the maximum required SOC.

The air flow rate control unit may reduce the degree of opening of the air pressure control valve on the opening degree compensation map, when the accumulated charge energy of the high voltage battery exceeds reference energy.

The air flow rate control unit may increase a degree of opening of the air pressure control valve on the opening degree compensation map, and control the air pressure control valve on the basis of an updated opening degree compensation map that is updated according to the increased degree of opening, when the SOC of the high voltage battery is less than a set SOC and a stack current requirement is less than a reference current.

The air flow rate control unit may reset charge energy of the high voltage battery, and accumulate discharge energy of the high voltage battery, when the SOC of the high voltage battery is less than the set SOC and the stack current requirement is less than the reference current.

The air flow rate control unit may increase the degree of opening of the air pressure control valve on the opening degree compensation map, when the accumulated discharge energy of the high voltage battery exceeds reference energy.

The air flow rate control unit may control the air pressure control valve on the basis of the currently used opening degree compensation map, when the SOC of the high voltage battery is greater than or equal to a set SOC and is less than a maximum required SOC.

The air flow rate control unit may control the air pressure control valve on the basis of the currently used opening degree compensation map, when the SOC of the high voltage battery is less than a set SOC and a stack current requirement is greater than or equal to a reference current.

The air flow rate control unit may output the control signal with respect to the air pressure control valve on the basis of the opening degree compensation map, and reset accumulated energy of the high voltage battery.

The air flow rate control unit may control the air pressure control valve on the basis of the basic opening degree map, when the SOC of the high voltage battery is less than the minimum required SOC.

According to another aspect of the present disclosure, an operation control method for a fuel cell vehicle, includes: determining, by an operation control device, whether an operation state of a fuel cell stack is in an upper-limit voltage limiting section on the basis of a stack current of the fuel cell stack; monitoring, by the operation control device, a state of charge (SOC) of a high voltage battery, and determining whether the SOC of the high voltage battery is in a set reference SOC range; and determining, by the operation control device, a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

According to another aspect of the present disclosure, a non-transitory computer readable medium containing program instructions executed by a processor includes: program instructions that determine whether an operation state of a fuel cell stack is in an upper-limit voltage limiting section on the basis of a stack current of the fuel cell stack; program instructions that monitor a state of charge (SOC) of a high voltage battery, and determining whether the SOC of the high voltage battery is in a set reference SOC range; and program instructions that determine a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
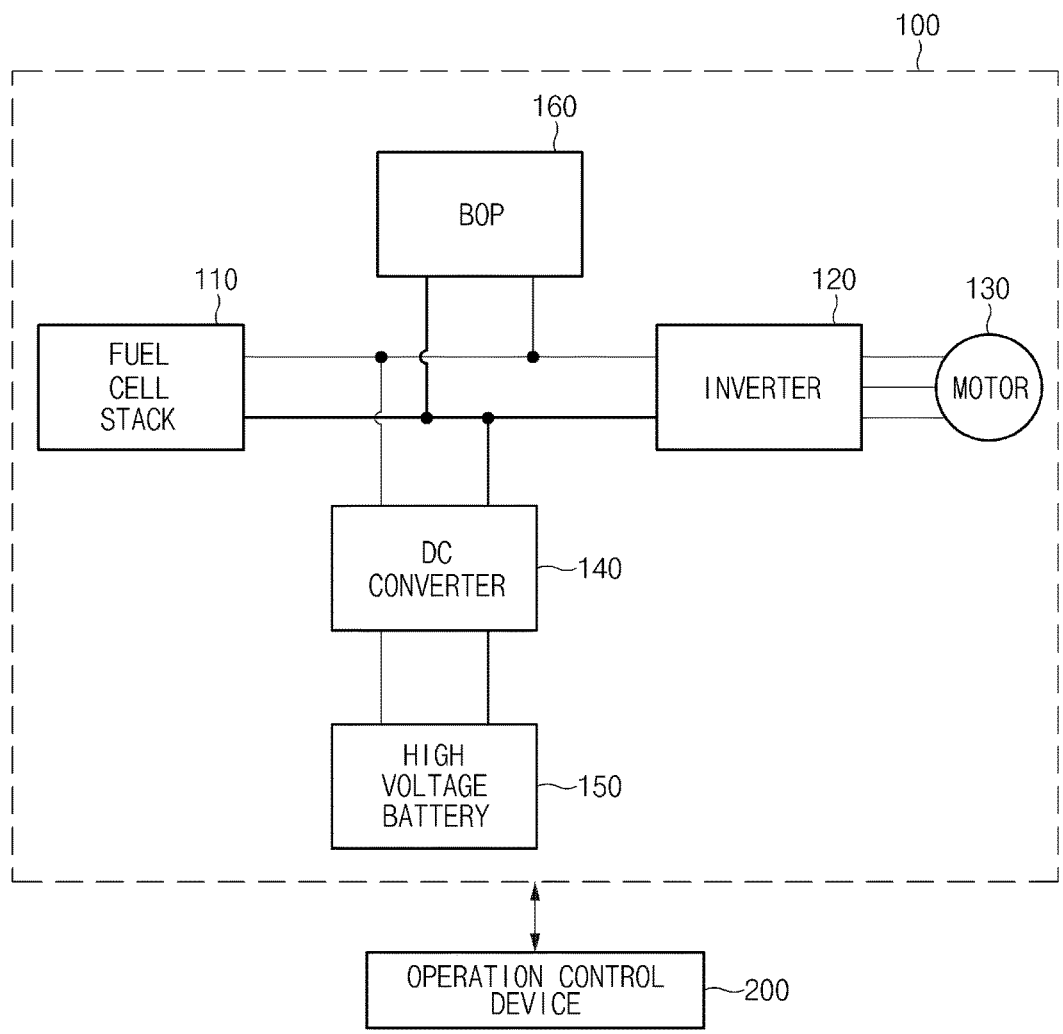
FIG. 1 illustrates the configuration of a vehicle system, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates the configuration of a vehicle system, according to an exemplary embodiment of the present disclosure.

Referring to FIG. 1, a vehicle system, according to an exemplary embodiment of the present disclosure, may include a vehicle 100 and an operation control device 200.

The vehicle 100 may include a fuel cell stack 110, an inverter 120, a motor 130, a direct current (DC) converter 140, a high voltage battery 150, and balance of plant (BOP) 160. Here, the fuel cell stack 110, the inverter 120, the DC converter 140, and the BOP 160 may be connected through buses.

The fuel cell stack 110 may supply a driving voltage as a power source of the fuel cell vehicle to drive the motor 130.

Here, the fuel cell stack 110 may be formed by repeatedly stacking a plurality of unit cells and fastening the stacked cells.

The inverter 120 may convert DC power supplied from the fuel cell stack 110 or the high voltage battery 150 to alternating current (AC) power and supply the AC power to the motor 130. Thus, the motor 130 may rotate using the AC power from the inverter 120.

The DC converter 140 may control an output voltage of the fuel cell stack 110 and an output voltage of the high voltage battery 150. Here, the DC converter 140 may receive the output voltage from at least one of the fuel cell stack 110 and the high voltage battery 150 and convert the received voltage to a predetermined level of DC voltage to output the converted DC voltage. The DC converter 140 may output the converted DC voltage to the inverter 120 and the BOP 160.

In addition, the DC converter 140 may convert the output voltage of the high voltage battery 150 to the DC voltage and supply the converted voltage to the fuel cell stack 110. In addition, the DC converter 140 may step down the output voltage of the fuel cell stack 110 and supply the stepped-down voltage to the high voltage battery 150. In this case, the high voltage battery 150 may be charged with the stepped-down voltage from the DC converter 140.

Here, the fuel cell stack 110 may operate by limiting an upper-limit voltage to a predetermined voltage (for example, A[V]) in order to prevent deterioration. The DC converter 140 may limit charge/discharge energy of the fuel cell stack 110 to the predetermined upper-limit voltage in a section in which the fuel cell stack 110 operates by limiting the upper-limit voltage (hereinafter referred to as the "upper-limit voltage limiting section"). Changes in stack voltage in the upper-limit voltage limiting section of the fuel cell stack 110, according to an exemplary embodiment, will be described with reference to FIG. 4.

Figure 4:
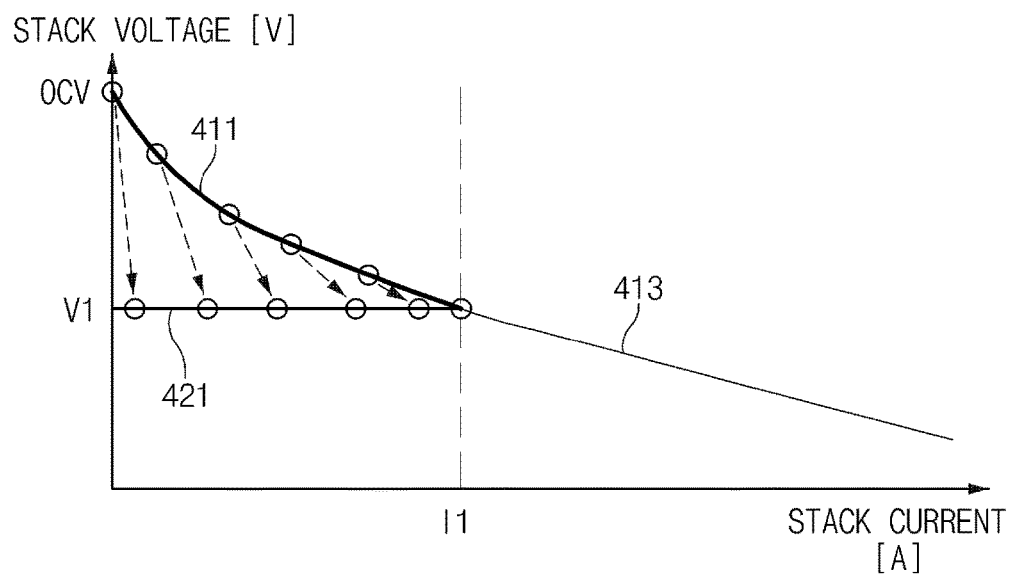
FIGS. 4-6 and 7A-7B illustrate operations of an operation control device for a fuel cell vehicle, according to exemplary embodiments of the present disclosure.

Referring to FIG. 4, since the fuel cell stack 110 is controlled by an open circuit voltage (OCV) in a normal operation section, the voltage performance thereof is illustrated as a graph 413.

Meanwhile, in the upper-limit voltage limiting section, the voltage performance of the fuel cell stack 110 may be limited to a limit voltage (V1) (i.e., the limit voltage from a graph 411 to a graph 421). When the upper-limit voltage of the fuel cell stack 110 is limited to the limit voltage V1 lower than the voltage performance of the fuel cell stack 110 in the normal operation section, a predetermined stack current I1 may be generated in the fuel cell stack 110.

In this regard, the operation control device 200 may reduce an air flow rate in the upper-limit voltage limiting section of the fuel cell stack 110 so as to reduce the stack current generated due to the limitation on the upper-limit voltage of the fuel cell stack 110.

The BOP 160 includes components required for the operation of the fuel cell stack 110. For example, the BOP 160 may include components constituting an air supply system 170, such as an air compressor, a humidifier, and an air pressure control (APC) valve.

When the charge/discharge energy of the fuel cell stack 110 is limited to the predetermined upper-limit voltage in the upper-limit voltage limiting section of the fuel cell stack 110, the air supply system 170 may control an air flow rate in order to reduce the amount of current generated in the fuel cell stack 110.

The operation of the air supply system 170 in the upper-limit voltage limiting section of the fuel cell stack 110, according to an exemplary embodiment, will be described with reference to FIG. 2.

The operation control device 200 may control an air flow rate supplied to the fuel cell stack 110 according to an operation state of the fuel cell stack 110 and a state of charge (SOC) of the high voltage battery 150. Here, the operation control device 200 may control the air flow rate supplied to the fuel cell stack 110 by controlling the revolutions per minute (RPM) of the air compressor and the degree of opening of the air pressure control valve.

The operation control device 200, according to an exemplary embodiment of the present disclosure, may be provided in the interior of the vehicle. In this case, the operation control device 200 may be integrally formed with internal control units of the vehicle, or may be provided as a separate device that is connected to the control units of the vehicle through separate connectors. Here, the operation control device 200 may be connected to the individual elements of the vehicle 100 to transmit and receive signals.

Meanwhile, the vehicle 100 may further include the air supply system 170.

Figure 2:
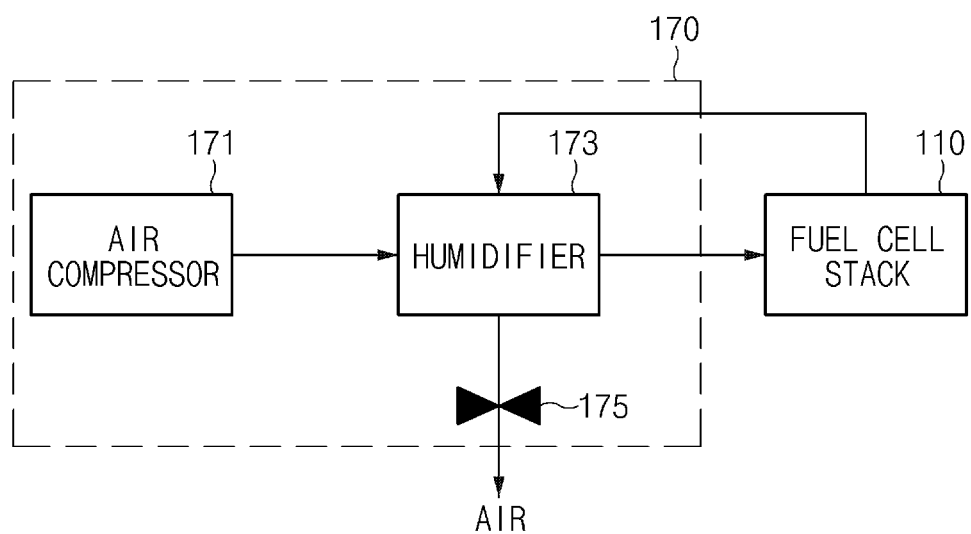
FIG. 2 illustrates the configuration of an air supply system of a vehicle, according to an exemplary embodiment of the present disclosure.

FIG. 2 illustrates the configuration of an air supply system of a vehicle, according to an exemplary embodiment of the present disclosure.

Referring to FIG. 2, the air supply system 170 may include an air compressor 171, a humidifier 173, and an air pressure control valve 175.

The air compressor 171 may receive a driving voltage from the DC converter 140 and be driven to supply air containing oxygen to the fuel cell stack 110.

The air compressor 171 may drive a motor (not shown) with the driving voltage from the DC converter 140 to rotate a blower fan. The air compressor 171 may compress the outside air sucked through the blower fan and supply the compressed air to the humidifier 173.

Here, the operation control device 200 may control the air flow rate by controlling the RPM of the motor of the air compressor 171. Thus, the air compressor 171 may supply the regulated amount of air to the humidifier 173 under the control of the operation control device 200. For example, the RPM of the motor of the air compressor 171 may be reduced by the operation control device 200 in the upper-limit voltage limiting section of the fuel cell stack 110.

The humidifier 173 may humidify the air supplied from the air compressor 171 to supply the humidified air to the fuel cell stack 110. Then, the humidifier 173 may discharge the remaining air through an air outlet.

The air pressure control valve 175 may be disposed in the air outlet of the humidifier 173. The air pressure control valve 175 may control a pressure of the air discharged externally from the humidifier 173 under the control of the operation control device 200.

For example, the degree of opening of the air pressure control valve 175 may be reduced or increased under the control of the operation control device 200 in the upper-limit voltage limiting section of the fuel cell stack 110.

Figure 3:
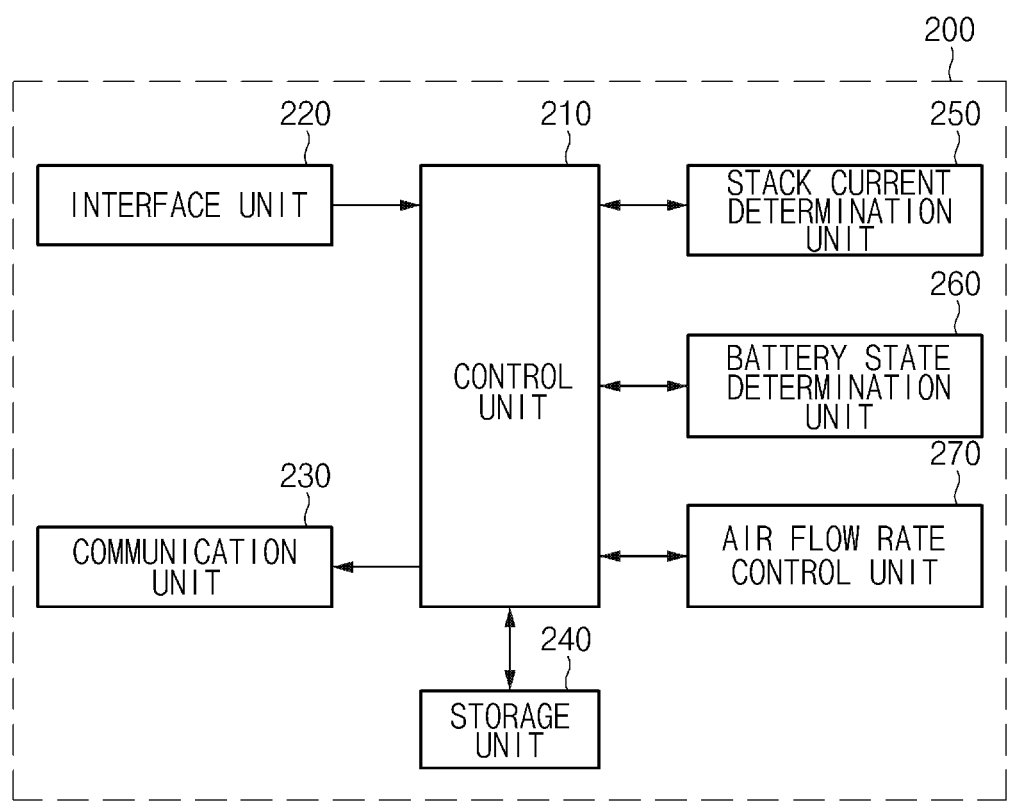
FIG. 3 illustrates the configuration of an operation control device for a fuel cell vehicle, according to an exemplary embodiment of the present disclosure.

FIG. 3 illustrates the configuration of an operation control device for a fuel cell vehicle, according to an exemplary embodiment of the present disclosure.

Referring to FIG. 3, the operation control device 200 may include a control unit 210, an interface unit 220, a communication unit 230, a storage unit 240, a stack current determination unit 250, a battery state determination unit 260, and an air flow rate control unit 270. Here, the control unit 210 may process signals received and transmitted between the above-mentioned elements of the operation control device 200.

The interface unit 220 may include an input unit for receiving a control command from a user, and an output unit for outputting the operation state, result, and the like of the operation control device 200.

Here, the input unit may include key buttons, and may also include a mouse, a joystick, a jog shuttle, a stylus pen, and the like. In addition, the input unit may also include soft keys on display.

The output unit may include a display unit, and may also include an audio output unit such as a speaker. When a touch sensor, such as a touch film, a touch sheet, or a touch pad, is provided on the display unit, the display unit may operate as a touch screen, and the input unit and the output unit may be integrated.

Here, the display unit may include at least one of liquid crystal display (LCD), thin film transistor-liquid crystal display (TFT LCD), organic light emitting diode (OLED), flexible display, field emission display (FED), and 3D display.

The communication unit 230 may include a communication module that supports a communication interface with the elements of the vehicle 100 and the control units provided in the vehicle. For example, the communication module may receive information about the states of the fuel cell stack 110 and the high voltage battery 150 of the vehicle 100, and may transmit a control signal for controlling an upper-limit voltage to the DC converter 140. In addition, the communication module may also transmit a control signal for controlling an air flow rate to the air compressor 171 and the air pressure control valve 175 of the air supply system 170.

Here, the communication module may include a module supporting vehicle network communications, such as controller area network (CAN) communication, local interconnect network (LIN) communication, and Flex-Ray communication.

In addition, the communication module may include a module for wireless internet connection or a module for short range communication.

The storage unit 240 may store data and/or algorithm required for the operation of the operation control device 200.

The storage unit 240 may store the information about the states of the fuel cell stack 110 and the high voltage battery 150 received through the communication unit 230. In addition, the storage unit 240 may store an opening degree map for controlling the degree of opening of the air pressure control valve 175. Moreover, the storage unit 240 may store information about conditions required for the operation control device 200 to control the air flow rate of the air supply system 170, and store an algorithm for determining whether the set conditions are satisfied. Furthermore, the storage unit 240 may store a command and/or algorithm for controlling the air flow rate of the air supply system 170.

Here, the storage unit 240 may include a random access memory (RAM), a static random access memory (SRAM), a read-only memory (ROM), a programmable read-only memory (PROM), or an electrically erasable programmable read-only memory (EEPROM).

The stack current determination unit 250 may monitor the information about the state of the fuel cell stack 110 received through the communication unit 230. Here, the stack current determination unit 250 may determine whether the state of the fuel cell stack 110 is in the upper-limit voltage limiting section. Hereinafter, an operation section of the fuel cell stack 110 excepting the upper-limit voltage limiting section will be referred to as a normal operation section.

In addition, the stack current determination unit 250 may monitor a stack current of the fuel cell stack 110 in the upper-limit voltage limiting section of the fuel cell stack 110.

In order to prevent deterioration of the fuel cell stack 110, when the stack current of the fuel cell stack 110 is greater than or equal to a reference current, the RPM of the air compressor 171 and the degree of opening of the air pressure control valve 175 may be controlled to regulate the air flow rate.

Thus, the stack current determination unit 250 may monitor the stack current state, and determine whether the stack current (or the stack current requirement) is greater than or equal to the reference current. The stack current determination unit 250 may transmit the determination result to the control unit 210. Here, only when the stack current (or the stack current requirement) is greater than or equal to the reference current, the stack current determination unit 250 may transmit the corresponding information to the control unit 210.

The battery state determination unit 260 may monitor the information about the SOC of the high voltage battery 150 received through the communication unit 230.

The battery state determination unit 260 may compare the SOC of the high voltage battery 150 with a reference SOC in the upper-limit voltage limiting section of the fuel cell stack 110. Here, the reference SOC may include a first reference SOC as a basis for determining whether to update the opening degree map of the air pressure control valve 175, a second reference SOC as a basis for determining whether to reduce the degree of opening of the air pressure control valve 175, and a third reference SOC as a basis for determining whether to increase or maintain the degree of opening of the air pressure control valve 175. Here, the first reference SOC refers to a minimum required SOC, the second reference SOC refers to a maximum required SOC, and the third reference SOC refers to a set SOC.

The battery state determination unit 260 may transmit a result of comparing the SOC of the high voltage battery 150 with the first reference SOC, the second reference SOC and/or the third reference SOC to the control unit 210.

In addition, the battery state determination unit 260 may determine the charge energy or discharge energy of the high voltage battery 150. Here, the battery state determination unit 260 may compare the determined charge energy or discharge energy of the high voltage battery 150 with reference energy B, and transmit the comparison result to the control unit 210.

The control unit 210 may transmit the results from the stack current determination unit 250 and the battery state determination unit 260 to the air flow rate control unit 270. Thus, the air flow rate control unit 270 may determine the air flow rate of the air supply system 170 on the basis of the results determined by the stack current determination unit 250 and the battery state determination unit 260, and output a control signal with respect to the air compressor 171 and the air pressure control valve 175 according to the determined air flow rate.

In other words, when it is determined by the stack current determination unit 250 that the operation state of the fuel cell stack 110 is in the normal operation section, the air flow rate control unit 270 may output a control signal for controlling the air pressure control valve 175 to operate according to a basic opening degree map.

Meanwhile, when it is determined by the stack current determination unit 250 that the operation state of the fuel cell stack 110 is in the upper-limit voltage limiting section, the air flow rate control unit 270 may output control signals for controlling the RPM of the air compressor 171 and controlling the air pressure control valve 175 to operate according to an updated opening degree map in which the degree of opening of the air pressure control valve 175 is updated.

Hereinafter, a process of controlling the RPM of the air compressor 171 and the degree of opening of the air pressure control valve 175 in the upper-limit voltage limiting section, according to exemplary embodiments, will be described with reference to FIGS. 5 and 6.

Figure 5:
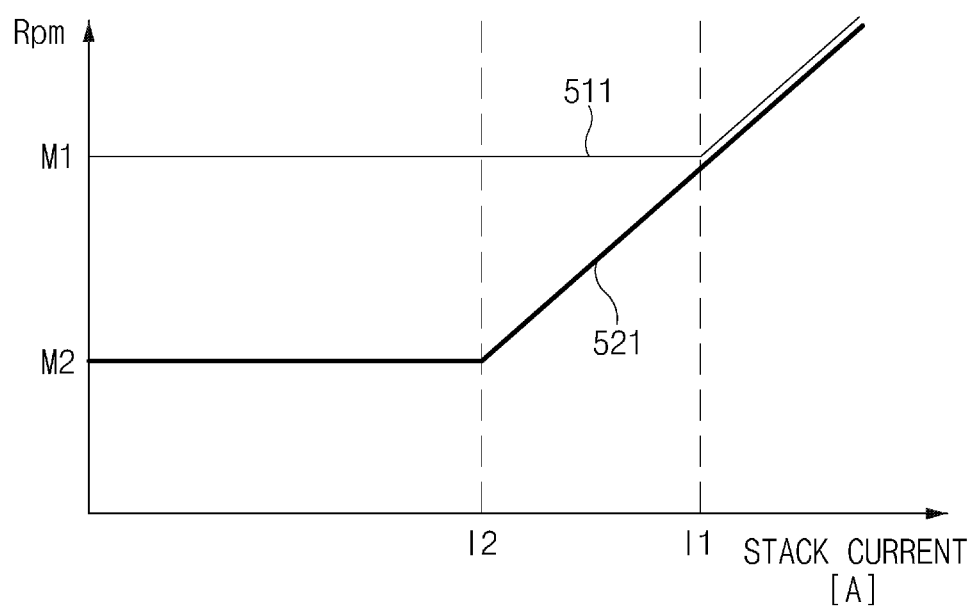
Figure 6:
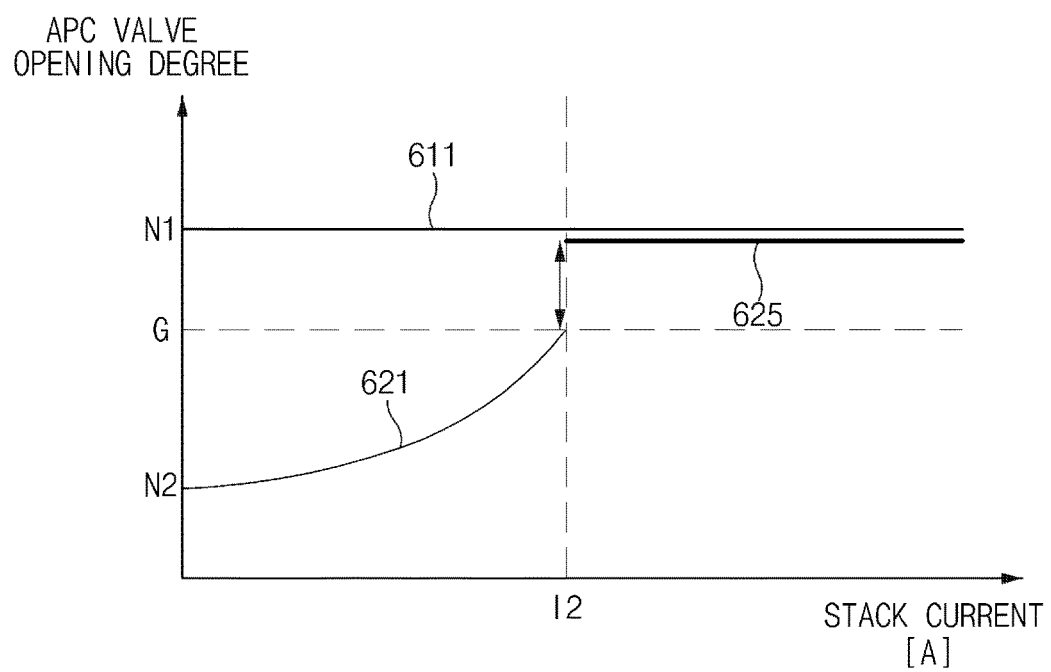

As illustrated in FIG. 5, when the operation state of the fuel cell stack 110 is in an upper-limit voltage limiting section (0[A]-I1[A]), the air flow rate control unit 270 may reduce the RPM of the air compressor 171 from a graph 511 to a graph 521 in an air flow rate control section (0[A]-I2 [A]). Here, a minimum RPM of the air compressor 171 may be reduced from M1 to M2 (where M2 is a minimum fixed RPM, M2<M1). When the RPM of the air compressor 171 is reduced from the graph 511 to the graph 521, an air flow rate supplied to the fuel cell stack 110 through the humidifier 173 may be reduced.

The air flow rate control unit 270 may reduce the air flow rate in the upper-limit voltage limiting section of the fuel cell stack 110, thereby reducing a stack current generated due to a limitation on the upper-limit voltage of the fuel cell stack 110.

However, the airfoil type air compressor 171 cannot be driven at a particular RPM or lower.

Thus, when only controlling the RPM of the air compressor 171 is not sufficient to control the air flow rate required, the air flow rate control unit 270 may control the RPM of the air compressor 171 together with the degree of opening of the air pressure control valve 175 to thereby reduce the stack current generated due to the limitation on the upper-limit voltage of the fuel cell stack 110.

The air flow rate control unit 270 may reduce the RPM of the air compressor 171 to the minimum fixed RPM M2. In addition, as illustrated in FIG. 6, the opening degree map for the control of the air pressure control valve 175 may be adjusted from a basic opening degree map based on N1 to an opening degree compensation map based on N2 (where N2<N1). Thus, the air flow rate control unit 270 may control the degree of opening of the air pressure control valve 175 according to the opening degree compensation map.

However, when the performance of the fuel cell stack 110 varies according to vehicles, even if it is controlled with the same air flow rate, the amount of the stack current generated may vary. Thus, it is difficult to completely solve the overcharge or overdischarge of the high voltage battery 150.

Thus, the air flow rate control unit 270 may reduce the RPM of the air compressor 171 to the minimum fixed RPM in the upper-limit voltage limiting section of the fuel cell stack 110, and compensate for the degree of opening on the opening degree compensation map according to the SOC of the high voltage battery 150 and the stack current (or the stack current requirement).

Details thereof will be described with reference to FIGS. 7A and 7B.

Figure 7A:
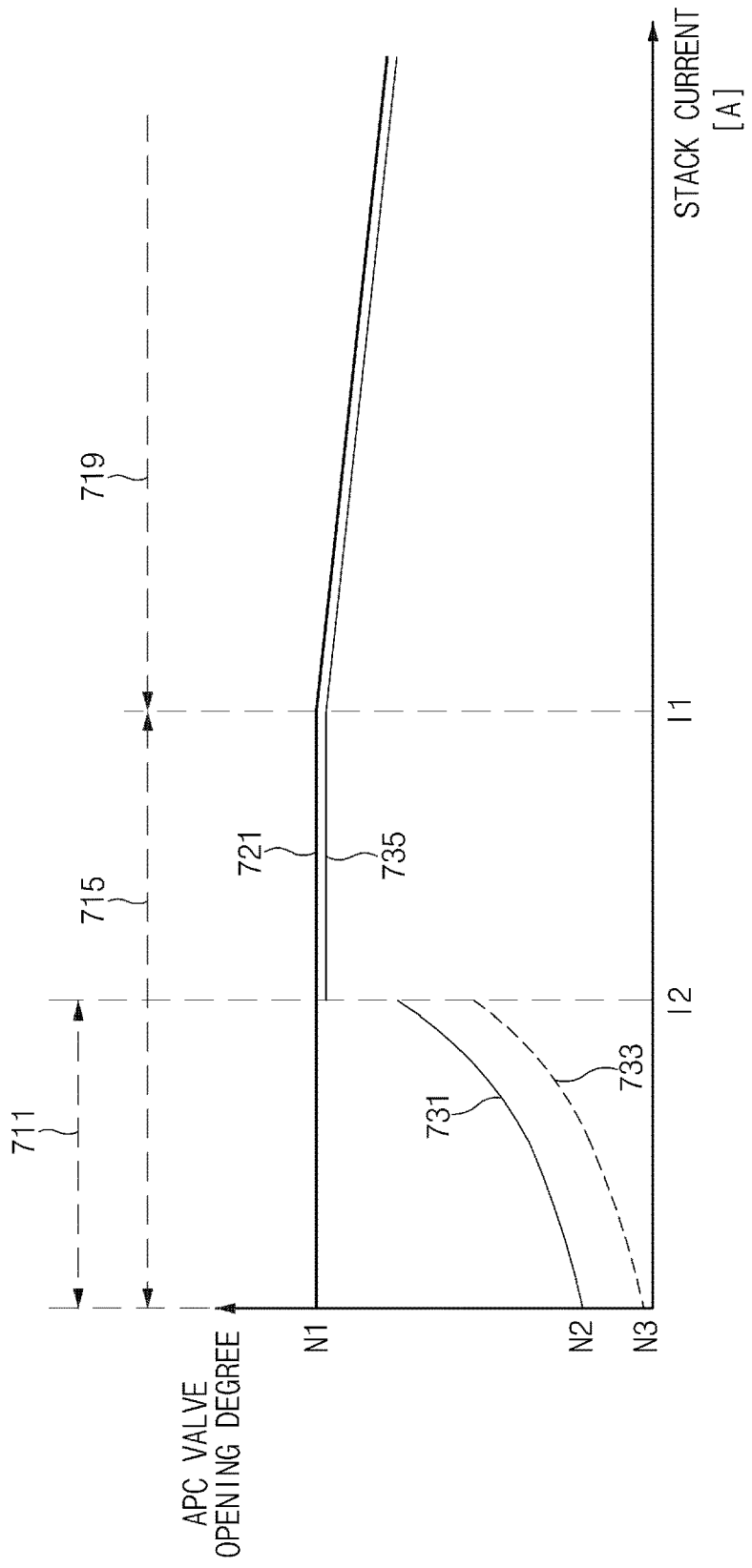
Figure 7B:
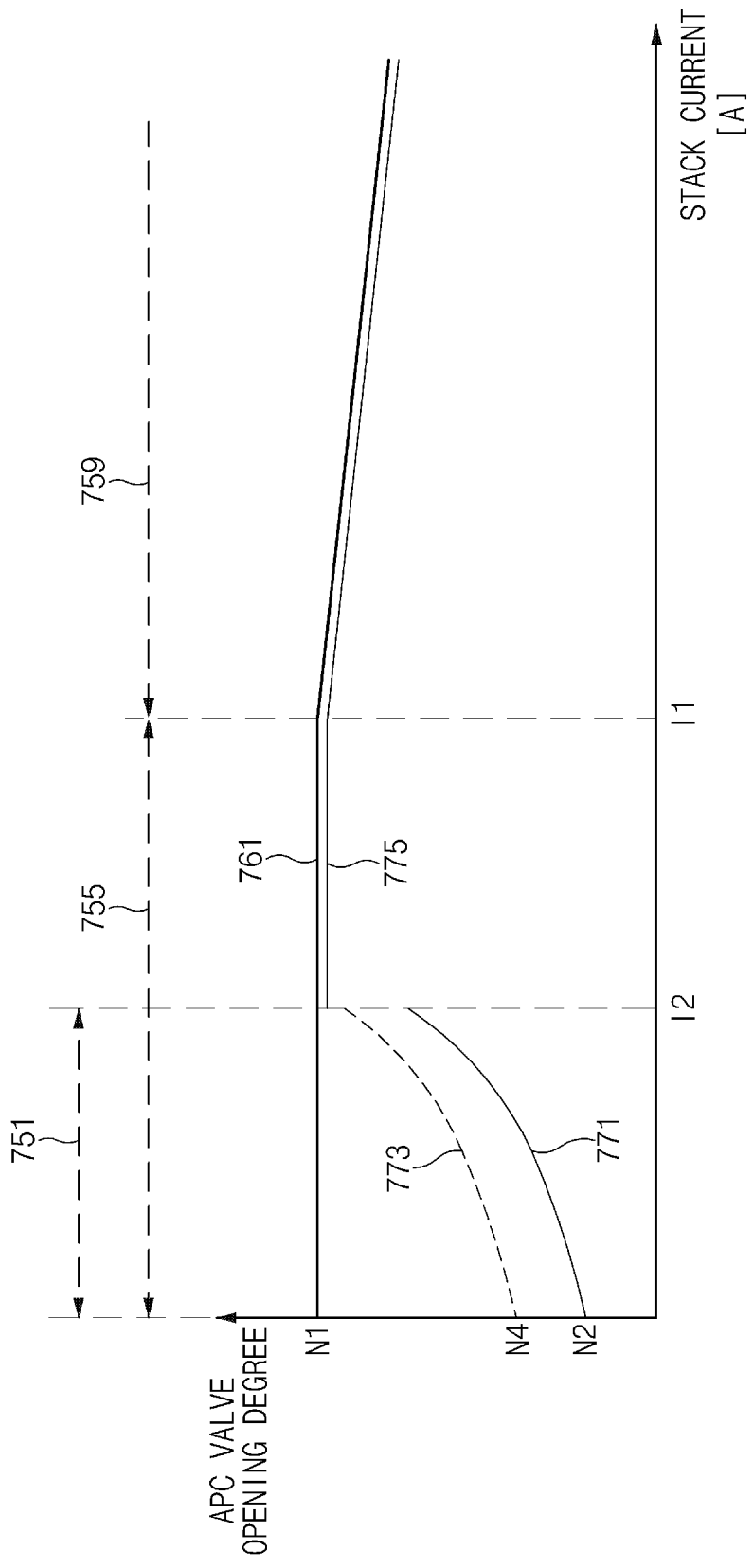

First of all, referring to FIGS. 7A and 7B, when the operation state of the fuel cell stack 110 is in an upper-limit voltage limiting section 715 or 755, the air flow rate control unit 270 may compare the SOC of the high voltage battery 150 with each of a first reference SOC A1, a second reference SOC A2, and a third reference SOC A3.

Here, the first reference SOC A1, the second reference SOC A2, and the third reference SOC A3 may satisfy A1<A3<A2.

When it is determined that the SOC of the high voltage battery 150 is less than A1, the air flow rate control unit 270 may determine that forced charging is required since the SOC of the high voltage battery 150 is very low. In this case, the air flow rate control unit 270 may control the degree of opening of the air pressure control valve 175 according to a basic opening degree map 721 or 761 based on N1.

Meanwhile, when it is determined that the SOC of the high voltage battery 150 is greater than or equal to A1, the air flow rate control unit 270 may determine that the air flow rate control is required, and reduce the degree of opening of the air pressure control valve 175 according to an opening degree compensation map 731 or 771 in an air flow rate control section 711 or 751. Here, when it is determined that the SOC of the high voltage battery 150 exceeds A2, the air flow rate control unit 270 may determine that it is required to reduce the degree of opening of the air pressure control valve 175.

In this regard, the air flow rate control unit 270 may reset discharge energy of the high voltage battery 150, and accumulate charge energy of the high voltage battery 150. When the accumulated charge energy of the high voltage battery 150 exceeds reference energy B, the air flow rate control unit 270 may reduce the degree of opening on the currently used opening degree compensation map, and update the opening degree compensation map of the air pressure control valve 175 according to the reduced degree of opening.

Here, the reduced degree of opening on the opening degree compensation map may be calculated using Equation 1 below.

$$N_{COMP} = N_{CURR} - k1 \times (A2 - D) \qquad \text{(Equation 1)}$$

In Equation 1, $N_{COMP}$ is a reduced degree of opening, $N_{CURR}$ is a degree of opening on the currently used opening degree compensation map, k1 is a compensation coefficient for the reduction of degree of opening, and D is an SOC reference value. Here, D satisfies A3<D<A2.

Thus, as illustrated in FIG. 7A, the air flow rate control unit 270 may update the currently used opening degree compensation map 731 based on N2 to an opening degree compensation map 733 based on N3 (where N3<N2) in the air flow rate control section 711, and reduce the degree of opening of the air pressure control valve 175 according to the updated opening degree compensation map 733.

Meanwhile, when it is determined that the SOC of the high voltage battery 150 is greater than or equal to A1 and is less than A3, the air flow rate control unit 270 may determine that it is required to increase the degree of opening of the air pressure control valve 175 on the opening degree compensation map in the air flow rate control section 751 according to a stack current requirement of the fuel cell stack 110. Here, when the stack current requirement is less than a reference current I2, the air flow rate control unit 270 may determine that it is required to increase the degree of opening of the air pressure control valve 175 on the opening degree compensation map.

In this regard, the air flow rate control unit 270 may reset charge energy of the high voltage battery 150, and accumulate discharge energy of the high voltage battery 150. When the accumulated discharge energy of the high voltage battery 150 exceeds the reference energy B, the air flow rate control unit 270 may increase the degree of opening on the currently used opening degree compensation map, and update the opening degree compensation map of the air pressure control valve 175 according to the increased degree of opening.

Here, the increased degree of opening on the opening degree compensation map may be calculated using Equation 2 below.

$$N_{COMP} = N_{CURR} + k2 \times (D - A3) \qquad \text{(Equation 2)}$$

In Equation 2, $N_{COMP}$ is an increased degree of opening, $N_{CURR}$ is a degree of opening on the currently used opening degree compensation map, k2 is a compensation coefficient for the increase of degree of opening, and D is an SOC reference value. Here, D satisfies A3<D<A2.

Thus, as illustrated in FIG. 7B, the air flow rate control unit 270 may update the currently used opening degree compensation map 771 based on N2 to an opening degree compensation map 773 based on N4 (where N4>N2) in the air flow rate control section 751, and increase the degree of opening of the air pressure control valve 175 according to the updated opening degree compensation map 773.

Meanwhile, when it is determined that the stack current requirement is greater than or equal to the reference current I2 in a state in which the SOC of the high voltage battery 150 is greater than or equal to A3 and is less than A2, or in which the SOC of the high voltage battery 150 is greater than or equal to A1 and is less than A3, the air flow rate control unit 270 may control the degree of opening of the air pressure control valve 175 according to the opening degree compensation map 731, 735, 771, or 775 based on N2 in the upper-limit voltage limiting section 715 or 755.

After controlling the degree of opening of the air pressure control valve 175 according to the currently used or updated opening degree compensation map, the air flow rate control unit 270 may reset the accumulated charge or discharge energy of the high voltage battery 150, and monitor the stack current state and the SOC of the high voltage battery 150 in real time.

Meanwhile, the air flow rate control unit 270 may control the degree of opening of the air pressure control valve 175 according to the basic opening degree map 721 or 761 in a normal operation section 719 or 759.

The sequence of actions of the operation control device having the above-described configuration, according to an exemplary embodiment of the present disclosure, will be described in more detail below.

Figure 8:
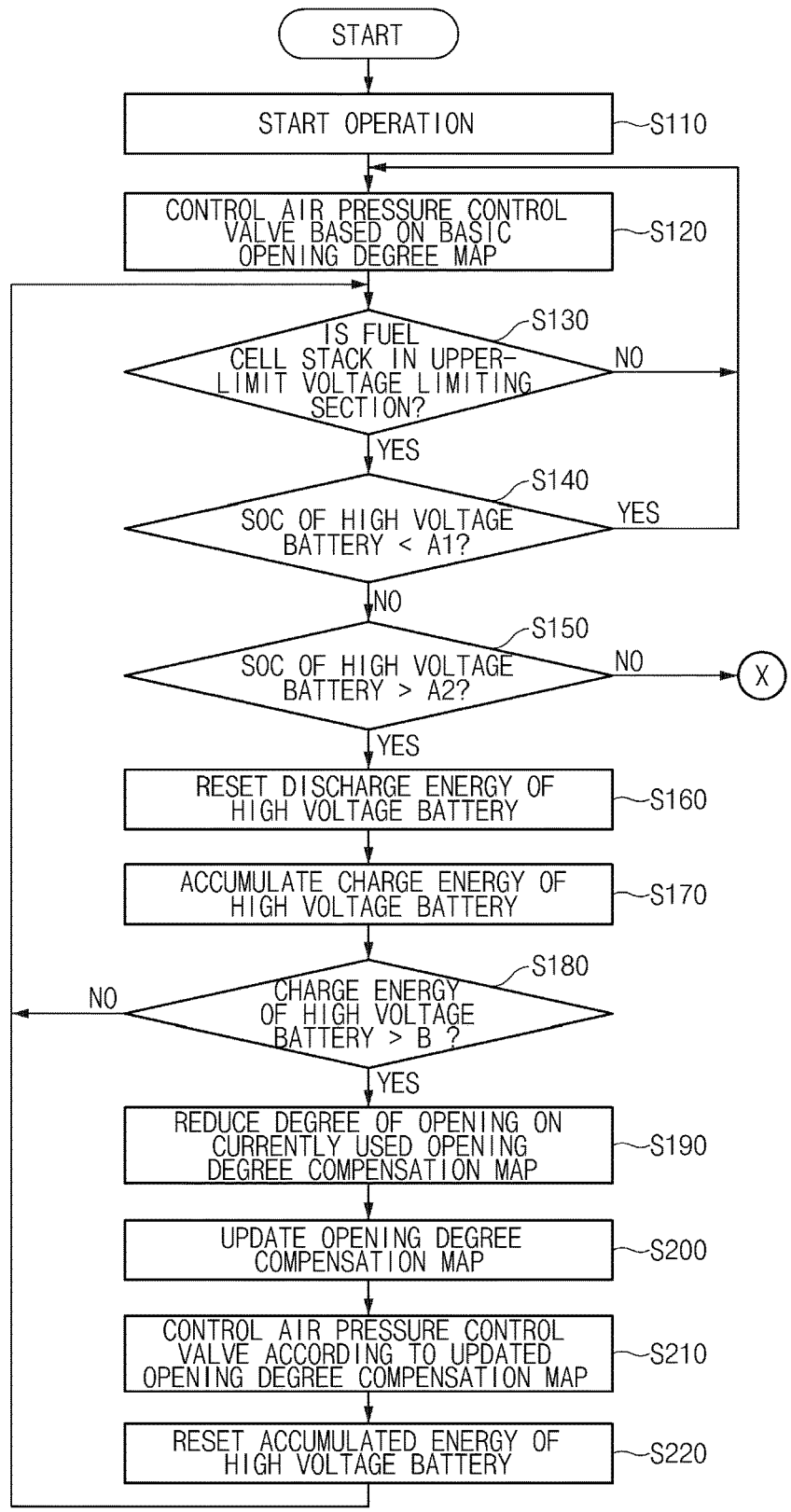
FIGS. 8 and 9 illustrate a flowchart of an operation control method for a fuel cell vehicle, according to an exemplary embodiment of the present disclosure.
Figure 9:
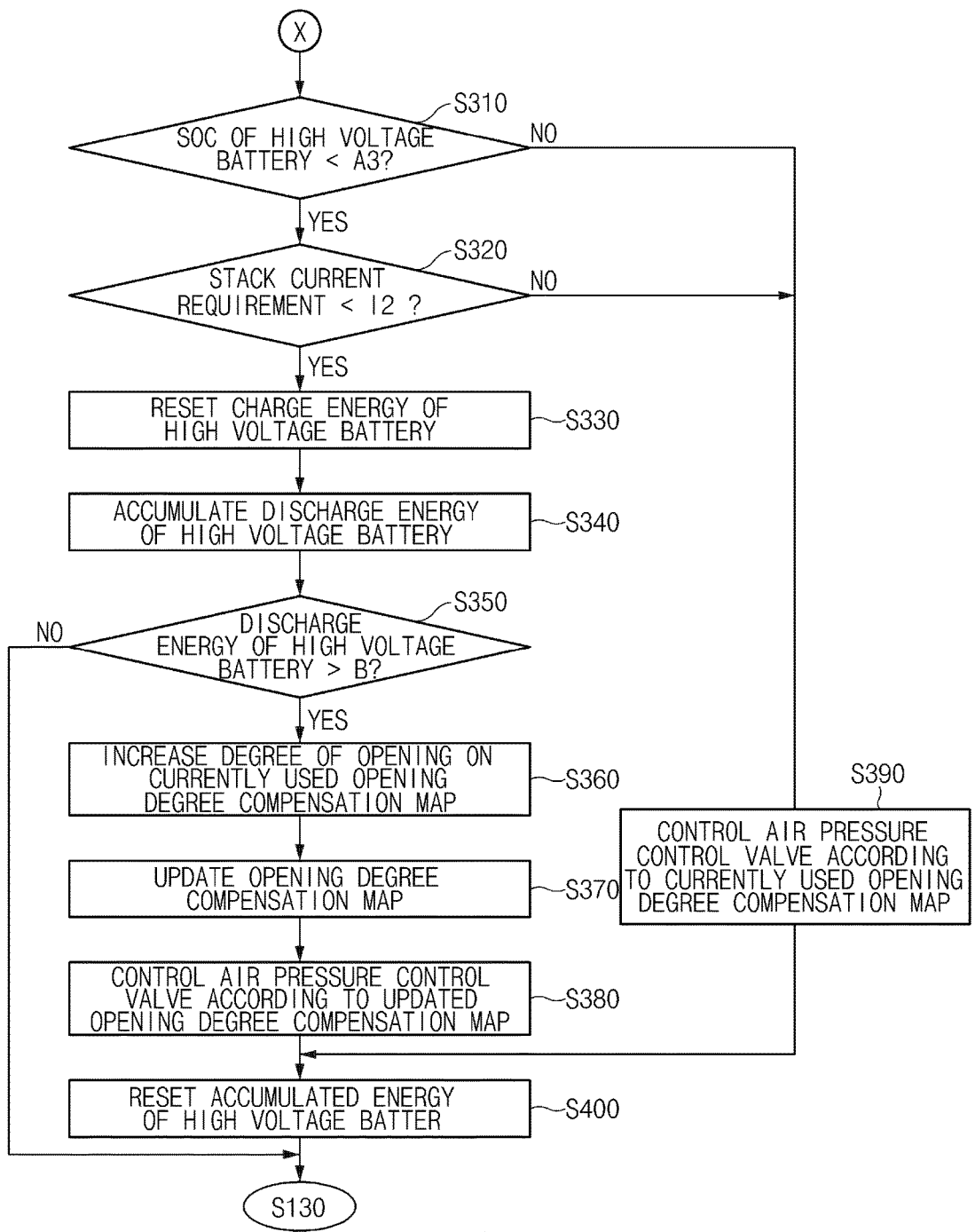

Referring to FIGS. 8 and 9, when the operation of the air supply system 170 is started in S110, the operation control device 200 may control the degree of opening of the air pressure control valve 175 according to a basic opening degree map in S120.

It may be determined whether the operation state of the fuel cell stack 110 is in an upper-limit voltage limiting section in S130. When it is determined in S130 that the operation state of the fuel cell stack 110 is in a nominal operation section rather than in the upper-limit voltage limiting section, the operation control device 200 may control the degree of opening of the air pressure control valve 175 according to the basic opening degree map.

Meanwhile, when it is determined in S130 that the operation state of the fuel cell stack 110 is in the upper-limit voltage limiting section, the operation control device 200 may compare the SOC of the high voltage battery 150 with a first reference SOC A1. Here, the first reference SOC A1 may refer to a minimum required voltage of the high voltage battery 150.

When it is determined in S140 that the SOC of the high voltage battery 150 is less than A1, the operation control device 200 may determine that forced charging of the high voltage battery 150 is required, and even though the operation state of the fuel cell stack 110 is in the upper-limit voltage limiting section, the operation control device 200 may control the degree of opening of the air pressure control valve 175 according to the basic opening degree map.

On the other hand, when it is determined in S140 that the SOC of the high voltage battery 150 is greater than or equal to A1, the operation control device 200 may compare the SOC of the high voltage battery 150 with a second reference SOC A2. Here, the second reference SOC A2 may refer to a maximum required voltage of the high voltage battery 150.

When it is determined in S150 that the SOC of the high voltage battery 150 exceeds A2, the operation control device 200 may reset discharge energy of the high voltage battery 150 in S160, and accumulate charge energy of the high voltage battery 150 in S170.

Here, when the accumulated charge energy of the high voltage battery 150 exceeds reference energy B in S180, the operation control device 200 may reduce the degree of opening of the air pressure control valve 175 on a currently used opening degree compensation map in S190, and update the opening degree compensation map of the air pressure control valve 175 according to the reduced degree of opening in S200.

Then, the operation control device 200 may control the air pressure control valve 175 according to the updated opening degree compensation map in S210. Thereafter, the operation control device 200 may reset the accumulated energy of the high voltage battery 150 in S220, and return to S130 and perform the subsequent steps again.

Meanwhile, when it is determined in S180 that the charge energy of the high voltage battery 150 is less than or equal to the reference energy B, the operation control device 200 may return to S130 and perform the subsequent steps again.

When it is determined in S150 that the SOC of the high voltage battery 150 is less than A2, the operation control device 200 may perform the following steps, starting from "X".

When the SOC of the high voltage battery 150 is less than A2, the operation control device 200 may compare the SOC of the high voltage battery 150 with a third reference SOC A3. When it is determined that the SOC of the high voltage battery 150 is less than A3 in S310, and a stack current requirement of the fuel cell stack 110 is less than a reference current I2 in S320, the operation control device 200 may reset charge energy of the high voltage battery 150 in S330, and accumulate discharge energy of the high voltage battery 150 in S340.

When it is determined in S350 that the accumulated discharge energy of the high voltage battery 150 exceeds the reference energy B, the operation control device 200 may increase the degree of opening of the air pressure control valve 175 on a currently used opening degree compensation map in S360, and update the opening degree compensation map of the air pressure control valve 175 according to the increased degree of opening in S370.

Then, the operation control device 200 may control the air pressure control valve 175 according to the updated opening degree compensation map in S380. Thereafter, the operation control device 200 may reset the accumulated energy of the high voltage battery 150 in S400, and return to S130 and perform the subsequent steps again.

Meanwhile, when it is determined in S350 that the discharge energy of the high voltage battery 150 is less than or equal to the reference energy B, the operation control device 200 may return to S130 and perform the subsequent steps again.

On the other hand, when the SOC of the high voltage battery 150 is greater than or equal to A3 in S310, or the stack current requirement is greater than or equal to the reference current I2 in S320, the operation control device 200 may control the air pressure control valve 175 while maintaining the degree of opening on the currently used opening degree compensation map in S390.

Then, the operation control device 200 may reset the accumulated energy of the high voltage battery 150 in S400, and return to S130 and perform the subsequent steps again.

The operation control device 200 according to the exemplary embodiment of the present disclosure may be provided as an independent hardware device, and may be provided as at least one processor included in other hardware devices such as a microprocessor or a general purpose computer system.

Figure 10:
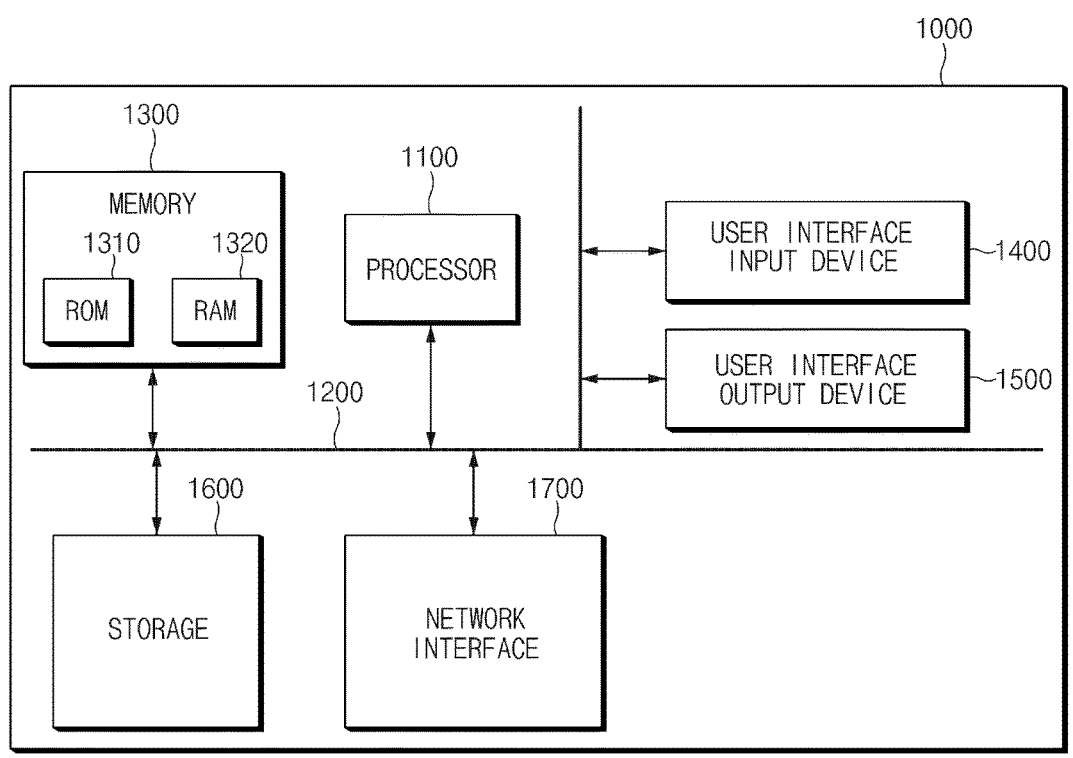
FIG. 10 illustrates the configuration of a computing system by which a method according to an exemplary embodiment of the present disclosure is executed.

FIG. 10 illustrates the configuration of a computing system by which a method according to an exemplary embodiment of the present disclosure is executed.

Referring to FIG. 10, a computing system 1000 may include at least one processor 1100, a bus 1200, a memory 1300, a user interface input device 1400, a user interface output device 1500, a storage 1600, and a network interface 1700, wherein these elements are connected through the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage media. For example, the memory 1300 may include ROM and RAM.

Therefore, the steps of the method or algorithm described in connection with the exemplary embodiments disclosed herein may be embodied directly in hardware, in a software module executed by the processor 1100, or in a combination thereof. The software module may reside in a storage medium (i.e., the memory 1300 and/or the storage 1600), such as RAM, a flash memory, ROM, EPROM, EEPROM, a register, a hard disk, a removable disk, and a CD-ROM. An exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. Alternatively, the processor 1100 and the storage medium may reside as discrete components in a user terminal.

As set forth above, the operation control device and method for a fuel cell vehicle can precisely control an air flow rate according to SOCs during an upper-limit voltage limiting operation at a low air flow rate, thereby preventing the overdischarge or overcharge of the high voltage battery and maintaining the existing SOC control function.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An operation control device for a fuel cell vehicle, the device comprising:

a stack current determination unit determining whether an operation state of a fuel cell stack is in an upper-limit voltage limiting section on the basis of a stack current of the fuel cell stack;

a battery state determination unit monitoring a state of charge (SOC) of a high voltage battery and determining whether the SOC of the high voltage battery is in a set reference SOC range; and an air flow rate control unit determining a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

2. The device according to claim 1, wherein the air flow rate control unit outputs a control signal corresponding to the compensated air flow rate to an air compressor and an air pressure control valve of the air supply system.

3. The device according to claim 2, wherein the air flow rate control unit sets revolutions per minute (RPM) of the air compressor to a minimum RPM, and controls the air pressure control valve on the basis of an opening degree compensation map which is obtained by reducing a degree of opening of the air pressure control valve on a basic opening degree map used in a normal operation section of the fuel cell stack, when the SOC of the high voltage battery is greater than or equal to a minimum required SOC.

4. The device according to claim 3, wherein the air flow rate control unit reduces a degree of opening of the air pressure control valve on the opening degree compensation map, and controls the air pressure control valve on the basis of an updated opening degree compensation map that is updated according to the reduced degree of opening, when the SOC of the high voltage battery exceeds a maximum required SOC.

5. The device according to claim 4, wherein the air flow rate control unit resets discharge energy of the high voltage battery, and accumulates charge energy of the high voltage battery, when the SOC of the high voltage battery exceeds the maximum required SOC.

6. The device according to claim 5, wherein the air flow rate control unit reduces the degree of opening of the air pressure control valve on the opening degree compensation map, when the accumulated charge energy of the high voltage battery exceeds reference energy.

7. The device according to claim 3, wherein the air flow rate control unit increases a degree of opening of the air pressure control valve on the opening degree compensation map, and controls the air pressure control valve on the basis of an updated opening degree compensation map that is updated according to the increased degree of opening, when the SOC of the high voltage battery is less than a set SOC and a stack current requirement is less than a reference current.

8. The device according to claim 7, wherein the air flow rate control unit resets charge energy of the high voltage battery, and accumulates discharge energy of the high voltage battery, when the SOC of the high voltage battery is less than the set SOC and the stack current requirement is less than the reference current.

9. The device according to claim 8, wherein the air flow rate control unit increases the degree of opening of the air pressure control valve on the opening degree compensation map, when the accumulated discharge energy of the high voltage battery exceeds reference energy.

10. The device according to claim 3, wherein the air flow rate control unit controls the air pressure control valve on the basis of the currently used opening degree compensation map, when the SOC of the high voltage battery is greater than or equal to a set SOC and is less than a maximum required SOC.

11. The device according to claim 3, wherein the air flow rate control unit controls the air pressure control valve on the basis of the currently used opening degree compensation map, when the SOC of the high voltage battery is less than a set SOC and a stack current requirement is greater than or equal to a reference current.

12. The device according to claim 3, wherein the air flow rate control unit outputs the control signal with respect to the air pressure control valve on the basis of the opening degree compensation map, and resets accumulated energy of the high voltage battery.

13. The device according to claim 3, wherein the air flow rate control unit controls the air pressure control valve on the basis of the basic opening degree map, when the SOC of the high voltage battery is less than the minimum required SOC.

14. An operation control method for a fuel cell vehicle, the method comprising:
determining, by an operation control device, whether an operation state of a fuel cell stack is in an upper-limit voltage limiting section on the basis of a stack current of the fuel cell stack;
monitoring, by the operation control device, a state of charge (SOC) of a high voltage battery, and determining whether the SOC of the high voltage battery is in a set reference SOC range; and
determining, by the operation control device, a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

15. The method according to claim 14, wherein the controlling of the air flow rate comprises outputting a control signal corresponding to the compensated air flow rate to an air compressor and an air pressure control valve of the air supply system.

16. The method according to claim 15, wherein the controlling of the air flow rate comprises:
determining whether the SOC of the high voltage battery is greater than or equal to a minimum required SOC;
setting revolutions per minute (RPM) of the air compressor to a minimum RPM, when the SOC of the high voltage battery is greater than or equal to the minimum required SOC; and
controlling the air pressure control valve on the basis of an opening degree compensation map which is obtained by reducing a degree of opening of the air pressure control valve on a basic opening degree map used in a normal operation section of the fuel cell stack.

17. The method according to claim 16, wherein the controlling of the air pressure control valve comprises:
determining whether the SOC of the high voltage battery exceeds a maximum required SOC;
resetting discharge energy of the high voltage battery, and accumulating charge energy of the high voltage battery, when the SOC of the high voltage battery exceeds the maximum required SOC;
reducing a degree of opening of the air pressure control valve on the opening degree compensation map, when the accumulated charge energy of the high voltage battery exceeds reference energy; and
controlling the air pressure control valve on the basis of an updated opening degree compensation map that is updated according to the reduced degree of opening.

18. The method according to claim 16, wherein the controlling of the air pressure control valve comprises:
determining whether the SOC of the high voltage battery is less than a set SOC;
determining whether a stack current requirement is less than a reference current, when the SOC of the high voltage battery is less than the set SOC;
resetting charge energy of the high voltage battery, and accumulating discharge energy of the high voltage battery, when the stack current requirement is less than the reference current;
increasing a degree of opening of the air pressure control valve on the opening degree compensation map, when the accumulated discharge energy of the high voltage battery exceeds reference energy; and
controlling the air pressure control valve on the basis of an updated opening degree compensation map that is updated according to the increased degree of opening.

19. The method according to claim 18, wherein the controlling of the air pressure control valve further comprises controlling the air pressure control valve on the basis of the currently used opening degree compensation map, when the stack current requirement is greater than or equal to the reference current.

20. The method according to claim 18, wherein the controlling of the air pressure control valve further comprises controlling the air pressure control valve on the basis of the currently used opening degree compensation map, when the SOC of the high voltage battery is greater than or equal to the set SOC and is less than a maximum required SOC.

21. The method according to claim 16, wherein the controlling of the air flow rate further comprises resetting accumulated energy of the high voltage battery after the controlling of the air pressure control valve.

22. The method according to claim 16, wherein the controlling of the air flow rate further comprises controlling the air pressure control valve on the basis of the basic opening degree map, when the SOC of the high voltage battery is less than the minimum required SOC.

23. A non-transitory computer readable medium containing program instructions executed by a processor, the computer readable medium comprising:
program instructions that determine whether an operation state of a fuel cell stack is in an upper-limit voltage limiting section on the basis of a stack current of the fuel cell stack;
program instructions that monitor a state of charge (SOC) of a high voltage battery, and determining whether the SOC of the high voltage battery is in a set reference SOC range; and
program instructions that determine a compensation for an air flow rate of an air supply system according to the SOC of the high voltage battery, and controlling the air flow rate to be supplied to the fuel cell stack according to the compensated air flow rate, when the operation state of the fuel cell stack is in the upper-limit voltage limiting section.

* * * * *